(12) United States Patent
Cardona Aguirre

(10) Patent No.: US 10,801,290 B2
(45) Date of Patent: Oct. 13, 2020

(54) SAFETY SEALING AND REPARATION DEVICE AND METHOD FOR ELECTRICAL CABLES THAT PASS THROUGH WELLHEADS

(71) Applicant: Yadira Cardona Aguirre, Mosquera (CO)

(72) Inventor: Yadira Cardona Aguirre, Mosquera (CO)

(*) Notice: Subject to any disclaimer, the term of this patent is extended or adjusted under 35 U.S.C. 154(b) by 147 days.

(21) Appl. No.: 15/761,934

(22) PCT Filed: Sep. 21, 2016

(86) PCT No.: PCT/IB2016/055646
§ 371 (c)(1),
(2) Date: Mar. 21, 2018

(87) PCT Pub. No.: WO2017/051335
PCT Pub. Date: Mar. 30, 2017

(65) Prior Publication Data
US 2018/0274320 A1  Sep. 27, 2018

(30) Foreign Application Priority Data
Sep. 22, 2015  (CO) .................................. 15-224941

(51) Int. Cl.
*E21B 33/04* (2006.01)
*E21B 33/038* (2006.01)
(Continued)

(52) U.S. Cl.
CPC .......... *E21B 33/04* (2013.01); *E21B 33/0385* (2013.01); *H01B 17/30* (2013.01);
(Continued)

(58) Field of Classification Search
CPC ... E21B 33/0385; E21B 33/04; E21B 33/0407
See application file for complete search history.

(56) References Cited

U.S. PATENT DOCUMENTS 3,434,535 A * 3/1969 Johns ...................... E21B 34/10
166/72
4,154,302 A * 5/1979 Cugini ................ E21B 33/0407
166/378
(Continued)

FOREIGN PATENT DOCUMENTS

| CA | 2327987 A1 * | 6/2001 | ......... E21B 33/0407 |
| CA | 2838733 A1 * | 12/2012 | ......... E21B 33/0407 |

(Continued)

*Primary Examiner* — Jennifer H Gay
(74) *Attorney, Agent, or Firm* — Eugenio J. Torres-Oyola; Victor M. Rodriguez-Reyes; Ferraiuoli LLC

(57) ABSTRACT

A modular safety apparatus adapted to allow the flow and create a mechanical seal for a series of electric conductors in wellheads, thus, ensuring pressure control and internal hydraulic integrity and allowing for a method to repair leaks and/or conductor cables that does not require the use of specialized well maintenance equipment, comprising a sealing case attached to a lower connector, joined to another main or intermediating sealing case. The case seals towards the pipe hanger and attaches to the upper connector that seals towards the upper section of the wellhead and attaches to the protective bushing or the upper sealing case to ensure control of well's pressure during its operation or reparation in case of leaks or failures.

8 Claims, 5 Drawing Sheets

(51) Int. Cl.
  *H01B 17/30* (2006.01)
  *H02G 1/00* (2006.01)
  *H02G 3/00* (2006.01)
  *H02G 1/16* (2006.01)
  *H02G 15/23* (2006.01)
  *H02G 3/22* (2006.01)
  *E21B 43/12* (2006.01)

(52) U.S. Cl.
  CPC ............... *H02G 1/00* (2013.01); *H02G 1/16* (2013.01); *H02G 3/22* (2013.01); *H02G 15/23* (2013.01); *E21B 43/128* (2013.01)

(56) References Cited

U.S. PATENT DOCUMENTS

| | | | | |
|---|---|---|---|---|
| 4,600,054 | A * | 7/1986 | Miller | E21B 33/0407 166/65.1 |
| 4,627,489 | A * | 12/1986 | Reed | H01R 13/523 166/65.1 |
| 4,693,534 | A * | 9/1987 | Clark | H01R 13/533 439/275 |
| 4,708,201 | A * | 11/1987 | Reed | H01R 13/523 166/65.1 |
| 5,289,882 | A * | 3/1994 | Moore | E21B 17/003 166/379 |
| 5,722,844 | A * | 3/1998 | Schraeder | E21B 33/0407 439/190 |
| 5,795,169 | A * | 8/1998 | Reed | E21B 17/028 166/65.1 |
| 6,688,386 | B2 * | 2/2004 | Cornelssen | E21B 33/0407 166/65.1 |
| 6,736,208 | B2 * | 5/2004 | Riddell | E21B 33/0407 166/65.1 |
| 7,552,762 | B2 * | 6/2009 | Khazanovich | E21B 33/0385 166/379 |
| 9,388,654 | B2 * | 7/2016 | Urrego Lopera | E21B 33/0385 |
| 2002/0070030 | A1 * | 6/2002 | Smith | E21B 33/0407 166/379 |
| 2003/0136556 | A1 * | 7/2003 | Cornelssen | E21B 33/0407 166/65.1 |
| 2007/0137863 | A1 * | 6/2007 | Khazanovich | E21B 33/0385 166/379 |
| 2008/0144759 | A1 * | 6/2008 | Cook | E21B 17/08 375/371 |
| 2013/0277067 | A1 * | 10/2013 | Emerson | E21B 17/003 166/378 |
| 2014/0110164 | A1 * | 4/2014 | Emerson | E21B 33/0407 174/667 |
| 2014/0339774 | A1 * | 11/2014 | Urrego Lopera | E21B 33/0385 277/322 |
| 2015/0053392 | A1 * | 2/2015 | Emerson | E21B 33/0407 166/65.1 |
| 2016/0265697 | A1 * | 9/2016 | Tovar Murcia | E21B 33/02 |
| 2017/0175476 | A1 * | 6/2017 | Painter | E21B 33/0385 |
| 2018/0274320 | A1 * | 9/2018 | Cardona Aguirre | H01B 17/30 |
| 2018/0347305 | A1 * | 12/2018 | Angers, Jr. | E21B 33/072 |
| 2019/0218878 | A1 * | 7/2019 | Sneed | E21B 33/0355 |

FOREIGN PATENT DOCUMENTS

| | | | |
|---|---|---|---|
| CA | 2838733 C | 4/2019 | |
| CO | 6800257 A1 | 11/2013 | |
| CO | 6800260 A1 | 11/2013 | |
| GB | 2347952 A * | 9/2000 | ............. E21B 17/08 |
| WO | WO-9738467 A1 * | 10/1997 | ......... E21B 33/0407 |
| WO | WO-2012079071 A1 * | 6/2012 | ......... E21B 17/003 |
| WO | WO-2015067222 A1 * | 5/2015 | |
| WO | WO-2017051335 A1 * | 3/2017 | ............. H01B 17/30 |

* cited by examiner

SAFETY SEALING AND REPARATION DEVICE AND METHOD FOR ELECTRICAL CABLES THAT PASS THROUGH WELLHEADS

TECHNICAL FIELD

This invention refers to a safety device used to pass a series of electrical cables through wellheads and seal mechanically the well to ensure its internal hydraulic control, and a method to repair leaks and/or repair the cables in case of surface damages caused by terrorist attacks, vandalism, or intentional actions, and that do not require the use of specialized equipment that would need to lift the head and production piping. The device and method of the invention guarantee the control of the internal pressure of the well under normal operation conditions and have been designed to be used mainly in the energy sector, petroleum subsector, and particularly, in the oil and gas pumping and production systems.

PRIOR STATE OF THE ART

Fluids in oil or gas wells do not commonly reach the surface by itself; therefore, there are different types of artificial extraction that include the Electric Submersible Pumps (ESP), Electric Progressive Cavity Pumps (PCP) that require the complementary use of electric heaters in the bottom of the well with heavy oils (low API viscosity) in order to lighten the product and facilitate the extraction.

As they are electric, this equipment need to be plugged in to power sources outside the well; this can be done through electricity conducting elements (cables) that run from the inner to the outer part of the well. To introduce these elements, it is necessary to use sealing systems that allow the passing of cables through the wellheads, communicating the well's interior with external power sources, and maintaining the well's internal pressure.

In case of physical or functional failures in the sealing systems, such as leaks, breaks or damages in one or more cables located on the surface or inside the wellhead, it is necessary to use specialized well maintenance equipment (Workover). Using this type of equipment implies applying the following method: a) dismantle the wellhead, b) control and secure the well's pressure, c) raise the pipe line, d) remove a section of the pipes, e) repair the damage, and f) assemble the wellhead again; this is an undesirable operation because it produces a decrease in the pump system suction levels; also, it requires much time, money, and coordination due to its special logistic needs. So far, this method is the sole existing option to repair the mention damages in wellheads.

Currently, some oil-producing countries like Colombia and other Middle East and African countries are suffering internal or external armed conflicts for military, ethnical, social or religious reasons that seek the destruction of their foe's infrastructure; therefore, the oil industry is now the target of terrorist attacks, vandalism, malicious manipulation, or sabotage, in addition to extreme operation conditions; these are the main causes for damages to sealing systems of wellheads and electrical cables.

The first systems designed and used by the industry are called Electric fed-thru connector assembly as disclosed by patent U.S. Pat. No. 4,693,534 which uses a close-capsule principle called fed-thru assembly which locates through the tubing hanger, in the interior of the wellhead casing using an external mechanical sealing system (sleeve adapted to the equipment of the final user) and different electrical connection and contact systems in its interior. Its installation requires to cut the production cable and connect the system under the head; these contacts and connections create hot spots and the risk of short circuit power failures. In such case, it is necessary to replace the whole penetrator using specialized oil well service and reparation equipment (Workover) with the respective method and associated costs mentioned above.

Subsequently, to avoid cuts and connections beneath the head, penetrators where designed without having to cut epoxy sealed cables, as disclosed by patent CA2838733, where the users have the possibility to NOT cut the conductors because they use the principle of NOT making electric connections in the pressurized area. This system is installed under the tubing hanger inside the wellhead using and a single part adaptor that is installed through the tubing hanger. Its sealing system is a capsule that uses elastomeric and epoxy seals without having to make cuts; however, this type of seals is unreliable because the assembly procedure requires controlled environmental conditions and one epoxy mixture with complex and specialized procedures that will not produce uniform seals to guarantee tightness and avoid leaks if they are not performed properly. This type of sealing systems is based on a single seal without a backup in case of failure. Likewise, in case of damages to the electric cables, the sealing system must be replaced completely using workover equipment because it does not allow reparations.

There are also other mechanical sealing systems without cable cuts as that one disclosed in Colombian application CO6800260 that offers the users the possibility to NOT cut conductors, as with the other systems. This type of seals avoid the use of epoxy and generate a mechanical seal based on the use of elastomeric seals with conical and/or cylindrical shapes; they are placed on conical and/or cylindrical concurrent hole seal seats through which the cables pass and that when pushed by mechanical action in their assembly, the exercise inadequate pressure on the gaskets which, in turn, transmit the pressure toward the cables creating a high risk to damage them. These systems work based on the retention of pressure only in the gasket and a single dynamic point which makes the pressure to eventually damage the gasket and produce a leak of pressure due to the inexistence of a backup gasket. As with the other systems, they are installed using a single piece bushing adaptor that passes through the hanger. Manufacturers of this technology vary in the installation process: some install their sealing element under the hanger and others above; in both cases, if the cable fails, workover equipment will be necessary to repair or replace them. Although this type of systems do not require to replace the parts completely, as it happens with the other type, they are single-piece systems located through the tubing hanger and none of them can be disassembled without an adequate control of the pressure and the hydraulic integrity of the well that is performed with the workover equipment and, thus, show the same above mentioned disadvantages.

With the mechanical systems that seal above the hanger, outside the wellhead, as disclosed by patent application CO6800257, there is a risk and an additional operational flaw: the sealing element on the surface, the most vulnerable part of the system that can fail if there is unauthorized external manipulation or vandalism attacks, particularly with explosives. If it fails, the well cannot be controlled due to the loss of seal and a risk of major incidents such as spills, fires, and explosions will be present due to a leak of pressure or fluids through the damages penetrator; this increases the probability of environmental damages, considerable financial loss, and even human casualties. All these mechanical sealing systems comprise just one sealing element and do not have a backup in case of leaks.

Finally, the state of the art includes a mechanical sealing system that uses piston-type components; its operation is based on an elastomeric seal located between two pistons that move under pressure and compress the gaskets towards the cables; this reduces the risk that the cable suffer possible damages for excessive pressure; it is one of the most popular options in the Colombian market nowadays due to its advantages over the competing systems referred above. However, as in the previous system, this one is placed on the external surface of the wellhead, too, and connect it with the interior through a single-piece bushing adaptor, which in the end produces the problems mentioned before. Moreover, this system has an additional flaw: when moving to seal as a result of a pressure force, insufficient kinetical force could be produced to move the pistons at low pressures which, in the end, might release small amounts of gas.

In view of the foregoing, the goal of this invention is to eliminate the risks and flaws of the technologies and systems described herein to create a modular device that, together with a new installation method, adapts to different types of wellheads, maintains the safe and controlled integrity of the well, and in case of leaks or vandalism, allows the reparation of the sealing system and cables without having to use workover specialized equipment.

ADVANTAGES OF THE INVENTION

The safety sealing and reparation device and method for electrical cables that pass through wellheads subject matter of this invention patent application shows these advantages in respect to the devices that currently exist in the state of the art:

1. It is a mechanical device and does not contain electrical components; it is divided into parts, which makes it easy to adapt and install according to the characteristics of the wellhead and the needs and difficulty of the damage and/or reparation.
2. It has two sealing units to support the integrity and control of the well pressure even if one unit fails.
3. The sealing units are located inside the wellhead to prevent the unauthorized manipulation or the deliberate damage by external agents.
4. These are compact sealing units that activate without pressure; their internal components are immobilized mechanically which prevents the pressure to move the sealing gaskets deliberately.
5. Due to its interior geometrical configuration, the sealing system permits two simultaneous dynamic sealing points in each end of the elastomer to have a backup.
6. The device seals each electrical conductor (cables) in configurations of 1 to 3 cables simultaneously, in order to resist pressures of as much as 74.8 MPa under ideal conditions; this ensures work pressures of as much as 35 MPa for the user and uses a safety factor of 2.0+.
7. The inner part of the device seals the conductors exerting pressure on the outermost layer of the conductor, that is, on the mechanical protector of the insulation (lead), while the main seal is on the upper part of the device, which seals the intermediate layer of the conductor, i.e. on the dielectric insulation (Ethylene Propylene Oiene monomer (M-class) rubber) of the cable; this offers double protection and sealing backup to each conductor.
8. The device installed and operated with the method of this invention allows to disassemble the upper part of the wellhead, as well as disassemble, inspect, and/or repair the main upper seal, without losing control of the pressure integrity of the well, because it will always be sealed with the primary sealing case located in the lower part of the device.
9. When controlling the integrity of the well pressure itself, the device does not require the use of workover equipment to carry out inspections, maintenance and/or reparations for leaks or broken cables; this is the main advantage of the equipment.
10. This is a safety sealing system that ensures the control and integrity of the well fluids in case of a terrorist attack, riot, vandalism, or malicious manipulation on the surface.
11. As it is fully modular and adaptable, in case the electric conductors inside the wellhead require fixing, when the device subject matter of this invention is not installed, the well can be controlled using the standard methods with an additional operational cost, the device can be installed gradually and repair the conductors without having to raise the pipe lines to avoid the use of workover specialized equipment, substantially more expensive.
12. Using the device and method subject matter of this invention, it is possible to recover the electrical operation of the well in 6 hours or less; this produces important benefits because it is a fully modular device that can adapt to various wellheads and circumstances, does not require workover specialized equipment, and thus, lowers significantly the reparation costs and times which, in turn, reduces the loss associated to the production.

DESCRIPTION OF THE INVENTION

The safety sealing and reparation device and method for electrical cables that pass through wellheads subject matter of this invention patent application is a device that consists of parts that are put together to allow different configurations in order to adapt to wellheads of different sizes with different types of hangers. Likewise, its modular assembly makes it possible to use its parts separately depending on the configuration of the wellhead, the desired cable-sealing method, and/or the damages found in the cables.

Figure 1:
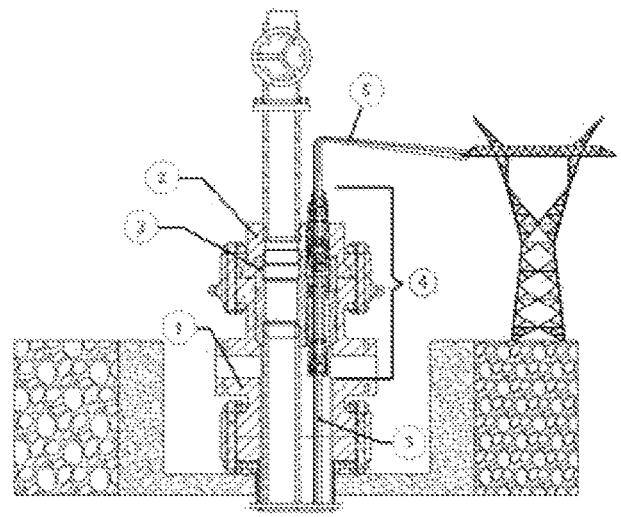
FIG. 1: Cut-away view of a generic and common wellhead; it illustrates how the electrical conductor or cable (5) that comes from the bottom of the well passes through the device subject matter of this invention (4), which is placed in the tubing hanger (3), between the lower section of the wellhead (1) and the upper section of the wellhead (2), sealing the well and permitting the cable (5) to connect with the external power source without losing the integrity of the pressure in the wellhead.

FIG. 1 shows a generic and common wellhead we will take as reference to describe this invention. It shows how the electrical cables (5) that come from the bottom of the well pass through the device subject matter of this invention (4) to be sealed inside; the device is screwed and sealed to the tubing hanger (3), located between the lower section of the wellhead (1) and the upper section of the wellhead (2) where, with the use of a-rings, it closes, seals, and gives integrity to the wellhead's pressure, and permits the cable (5) to connect with the external power source keeping the hydraulic control and integrity of pressure between the well and the external atmosphere.

Figure 2:
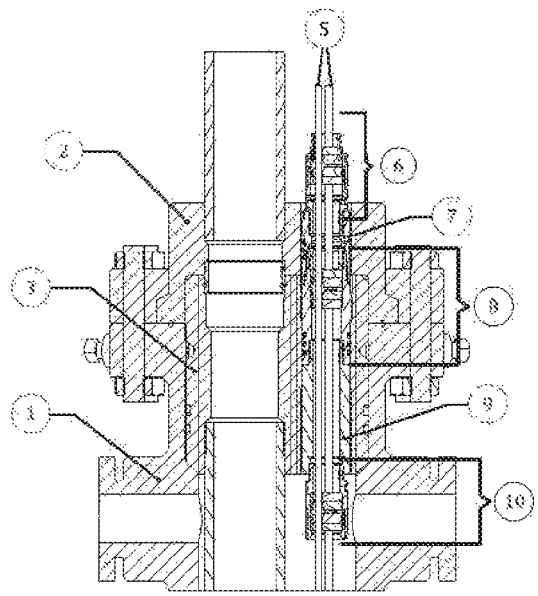
FIG. 2: Cut-away view of a wellhead with the device of this invention (4) installed and giving detail of its components.
Figure 3:
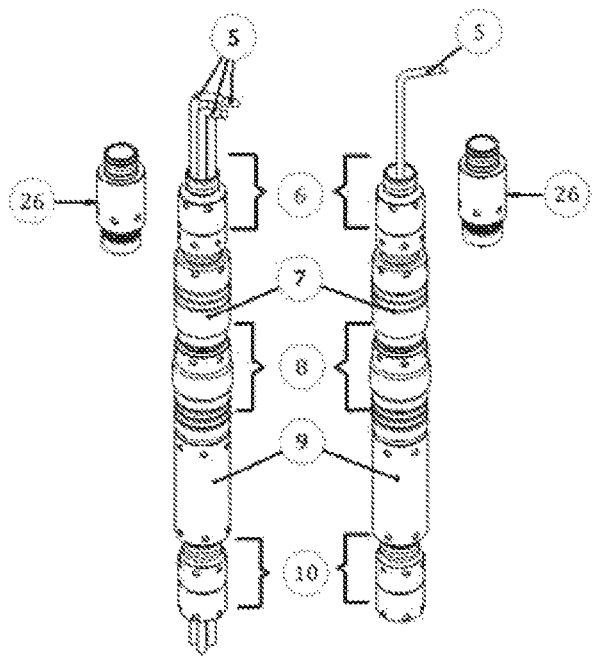
FIG. 3: It shows a 30 perspective of the device subject matter of this invention (4) with a configuration to seal or repair a single electrical cable (5) or three electrical cables (5); it also illustrates a 30 perspective view of the primary or lower sealing case (10), attached to the lower connector (9), attached to the main or intermediate sealing case (8) that attaches to the upper connector (7) which, in turn, attaches to the reparation or upper sealing case (6). Also, it shows the protecting bushing (26) that can replace the case (6) during the reparation process.

FIGS. 2 and 3 show the parts of the device subject matter of this invention (4). Starting from the bottom, this device consists of a primary or lower sealing case (10) that attaches to the lower connector (9), attached to the main or intermediate sealing case (8), which attaches to the upper connector (7) which, in turn, attaches to the reparation or upper sealing case (6) or to the protective bushing (26).

The electrical equipment used inside the well commonly use medium voltage power sources which require the use of three-phase systems with three electric conduction cables (5); this circumstance makes it necessary to have a product that can seal and/or repair each cable (5) separately. FIG. 3 shows two versions of the device subject matter of this invention: one is intended to allow just one cable to pass through; the second alternative, the most common, is adapted to allow three elecrical cables (5) pass through a single device simultaneously.

The version to be used will depend on the configuration of the wellhead, if it uses concentric tubing hangers (3) with three individual holes where the sealing device to be used has a path for just one cable located so that it matches the hole of the hanger and allows a single electrical conductor (5) to pass through each hole and each device; therefore, it is necessary to have three devices. Or if an eccentric single-hole tubing hanger (3) is used with one sealing and/or reparation device through which three electrical conductors (5) will pass at the same time; the latter version will be used to describe the invention.

Particularly, the object of this application is a sealing and reparation device (4) for electrical cables (5) that pass through wellheads (2); it comprises two or more connecting bushings (7, 9) and one to three sealing cases (6, 8, 10) where each of those cases contain a sealing unit (28) inside; at least one of those cases is installed inside the tubing hanger (3); and at least one of them attach to one of the connecting bushings (7, 9).

Figure 4:
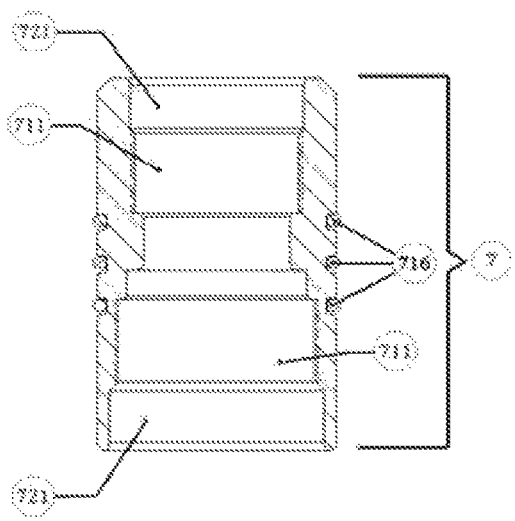
FIG. 4: Cut-away view of the upper connector (7).

In any of the methods defined before, the connecting bushing (7) shown in FIG. 4 is an upper bushing that has one or more sealing areas (721), one to three threading systems (711) that adapt and assemble to any of the sealing cases (6)(8) or to the protecting bushing (26), and has space for one to five a-rings on its outer surface (716); these a-rings seal against a through hole in the upper section of the wellhead (2).

Figure 5:
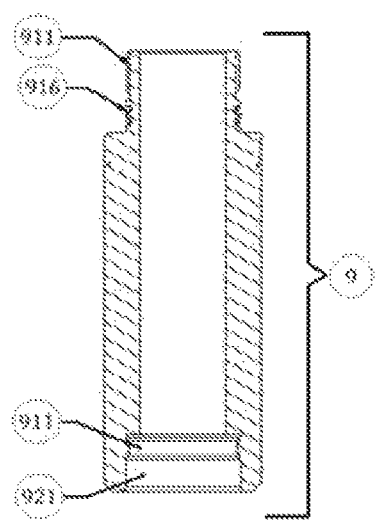
FIG. 5: Cut-away view of the lower connector (9).

In turn, connecting bushing (9) illustrated in FIG. 5 has one or two sealing areas (921), one to three threading systems (911) that adapt and assemble to any of the sealing cases (8, 10), and room for one to three a-rings (916) that seal against the sealing area (821) of sealing case (8).

Regarding the cases of the device (4) subject matter of this invention, all have one common sealing unit (28), one or more external threading systems (11) and room for one or more a-rings (16). In order to understand the figures better the number of the case (6, 8, 1) has been placed before the corresponding element to specify the element that is being mentioned. For example, sealing unit (28) of upper case (6) is indicated with reference number (628) while sealing unit (28) of case (8) has reference number (828) and sealing unit (28) of lower case (10) has reference number (128).

Figure 6:
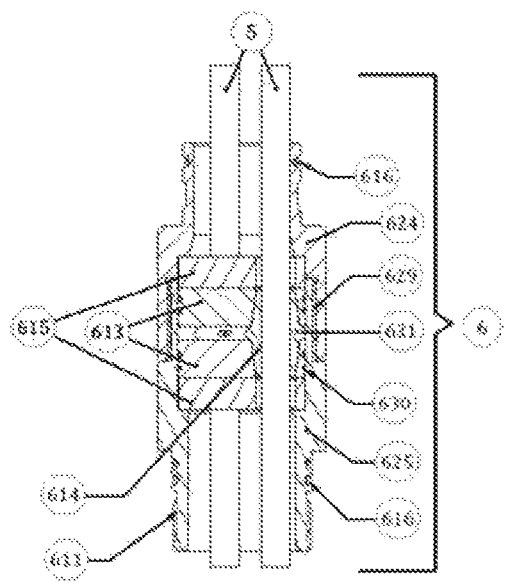
FIG. 6: Cut-away view of the reparation or upper sealing case (6); it also shows how the electrical cable (5) passes through the sealing case.

Hence, upper sealing case (6) shown in FIG. 6 is a reparation case that comprises an upper housing chamber (625), one or more threading systems (611), a seal housing (627) where the sealing unit (628) is located, and one or more spaces for a-rings (616), as well as an upper chamber closing ring (624) with a threading system (629).

Figure 7:
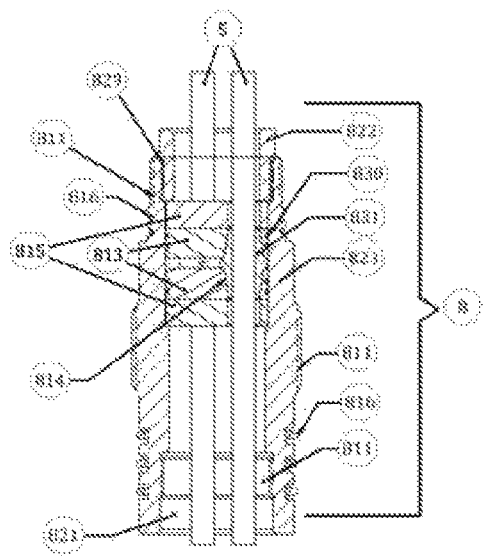
FIG. 7: Cut-away view of the main central sealing case (8); it also shows how the electrical cable (5) passes through this sealing case.

In turn, sealing case (8) shown in FIG. 7 is a main or intermediate seal that comprises a mandrel adaptor (823) with one or more threading systems (811) that adapt and attach to the various types of tubing hangers (3), connecting bushings (7, 9), a seal housing (827) where the sealing unit (828) is located, and one or more spaces for a-rings (816) that seal against the tubing hanger (3) and the connecting bushing (7); and an intermediate chamber closing ring (822) that attaches to a mandrel adaptor (823) by a threading system (829).

Figure 8:
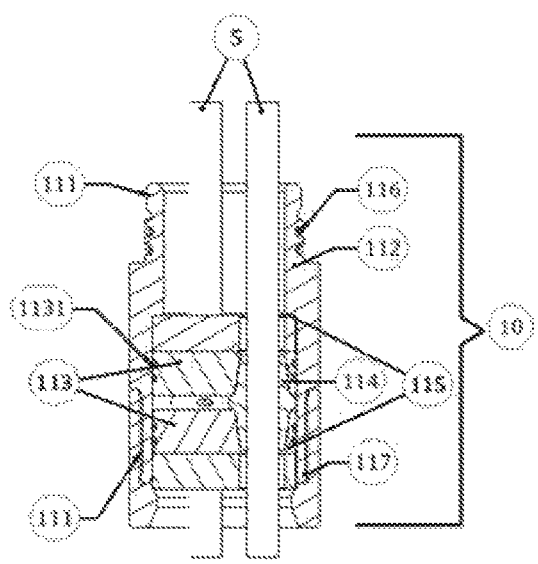
FIG. 8: Cross section of the primary or lower sealing case (10); it also shows how the electrical cable (5) passes through this sealing case.

Regarding sealing case (10) shown in FIG. 8, it is a primary or lower seal that consists of a lower housing chamber (112), one or more threading systems (111), a seal housing (127) where the sealing unit (128) is placed, and one or more spaces for a-rings (116); and a lower chamber closing ring (117) with a threading system (129).

Figure 9:
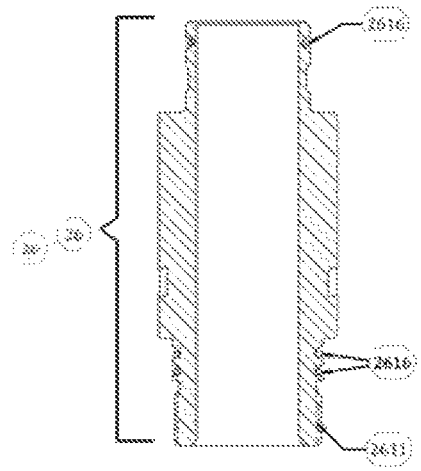
FIG. 9: Cut-away view of the protecting bushing (26).

In one alternative of the invention, the safety sealing and reparation device (4) comprises a protecting bushing (26) shown in FIG. 9 that can attach to the upper end of the connecting bushing (7) to replace the upper sealing case (6). This bushing (26) has threaded coupling systems (2611) and spaces to receive hydraulic contention a-rings (2616).

Figure 10:
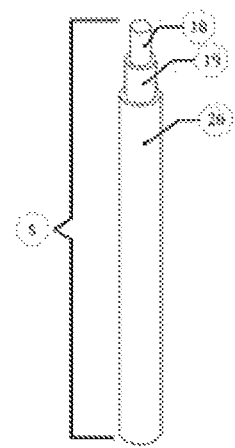
FIG. 10: 30 perspective view of the physical structure of an electrical cable (5) typically used in Electrical Submersible Pumps (ESP).

In the device of this invention, the connecting bushings (7, 9), cases (6, 8, 10), and the protecting bushing (26) are made of metal and have cylindrical inner and outer shapes while the electrical cables (5) typically used in Electric Submersible Pumps (ESP) consist of a copper conducting central core (18) with dielectric insulation made of Ethylene Propylene Diene monomer (M-class) rubber (19) and a lead mechanical protection (20), as it is shown in FIG. 10

Figure 11:
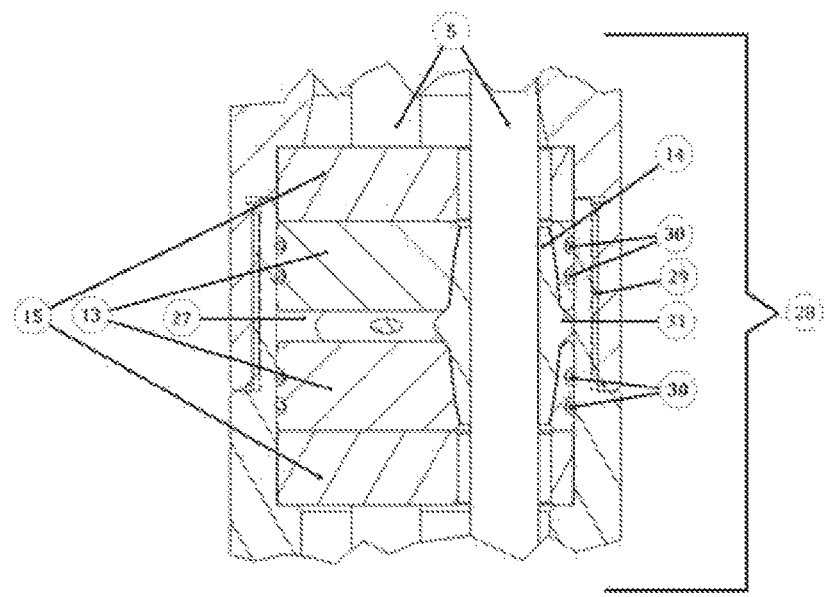
FIG. 11: Cut-away view that shows the assembly of the sealing unit (28) in detail.

As it was mentioned before, each case (6, 8, 10) contains a sealing unit (28) inside, as it is shown in FIG. 11; regardless of the corresponding case, the sealing unit (28) consists of two guide rings (15), two compression rings (13), and one to three sealing gaskets (14) depending on the number of electrical cables (5) that are being sealed simultaneously, one or three. The guide rings (15) are cylindrical outside and have one to three cylindrical through holes inside that serves as a geometrical guide for the electrical cables (5), providing a guide line to close the compression rings (13); it is made of dielectric materials to avoid transmitting electrical charges from one cable to the other which would produce failures in the circuit.

The sealing gaskets (14) are cylindrical inside and adapt to the cylindrical shape outside the electrical cables (5) that pass through their interior; they are curved or elliptical outside with or without a central protrusion similar to a compression a-ring (31); they perform as a mechanical lock and hydraulic contention. The compression ring (13) are cylindrical outside with one, two, or three slots for the hydraulic contention a-rings (30) and one or three through holes which diameters decrease, and which curved shape is compatible with the exterior shape of the sealing gaskets (14); they are made of metallic or dielectric materials resistant to high temperatures and corrosion.

These elements are located in a seal housing cylinder starting from the first guide ring (15) in the upper part, followed by the first compression ring (13); next, there are the sealing gaskets (14) and the second compression ring (13); finally, there is the second guide ring (15). This system is completed by a closing ring attached to the housing body, either the lower housing chamber (112), the mandrel adaptor (823), or the upper housing chamber (25) by male or female threaded couplings (29).

These elements are distributed in a way that the electrical cables (5) can pass through them to be sealed. Compression rings (13) are compressed one against the other by the mechanical action of tightening/screwing of the case threads; this makes the strength vector that runs parallel to the electrical cable (5) to compress the sealing gaskets (14) and change the direction of the strength vector to make it perpendicular to the electrical cable (5) and towards the center of such electrical cable (5); this makes the elastomeric seal (14) to compress towards the electrical cable (5); the hydraulic compression a-ring-type central protrusion (31) of the sealing gaskets (14) touches the internal surface of the compression rings (13) to block its movement and forms the required sealing barrier.

According to the configuration of the wellhead, the particular need, and the requirements of the client, it is possible to use and install two of the three sealing cases (6, 8, 10) or the three sealing cases simultaneously because the main requirement is to have two sealing areas; the first unit will seal on the lead mechanical protection (20) of the electric cables (5) shown in FIG. 10, and the second unit will seal on the EPDM dielectric insulation (19); both the lead protection (20) and the EPDM dielectric insulation recover the central copper electrical cable (18). The entire set is called electrical conductor or cable (5).

The third sealing case will be used to seal and/or repair de cable (5) on the surface of the wellhead. The three sealing units that are part of the device subject matter of this invention are the primary or lower sealing case (10), the main or intermediate sealing case (8), and the reparation or upper sealing case (6); all the mentioned sealing cases use the same sealing system or unit (28), which is shown in FIG. 11 and is described in detail below.

In a method of the invention, the safety sealing and reparation device (4) comprises a connecting bushing (7) and two sealing cases (6, 8) where case (8) is installed inside the tubing hanger (3); its upper end attaches to the lower end of the connecting bushing (7), and sealing case (6) attaches to the upper part of this connecting bushing (7).

In other method of the invention, the safety sealing and reparation device (4) comprises one or two connecting bushings (7, 9) and three sealing cases (6, 8, 10) where case (8) and/or case (10) are installed inside the tubing hanger (3); their upper end attaches to the lower end of connecting bushing (7) and sealing case (6) attaches to the upper part of this connecting bushing (7); and the lower end of case (8) attaches to the upper end of the connecting bushing (9) and sealing case (10) attaches to the lower part of this connecting bushing (9) or to case (8) by a tubing hanger (3).

The use of the device and the installation method of the invention (4) will depend on the user's need. Two scenarios have been identified to describe them: the first and ideal scenario is the installation of the device during the well's completion stage, that is to say, when the electrical equipment is being installed. The second scenario is placing the device during a reparation process.

The First Scenario has Two Options:

First, install the primary or lower seal (10) inside the tubing hanger (3) and the main or intermediate seal (8) in the upper part of the tubing hanger (3) where in case of failure or damages to the cable (5) on the surface of the wellhead, it will not require a pressure control equipment because device (4), with the primary or lower sealing case (10) previously installed will control the pressure and integrity of the well.

Second, install the intermediate seal (8) in the upper part of the tubing hanger (3) and the reparation or upper seal (6) in the upper part of the wellhead (2). As with option 1, in case of failure or damages to the cable (5) on the surface of the wellhead, it will not need a pressure control equipment because device (4), with the intermediate sealing case (8) previously installed will control the pressure and integrity of the well. In this case intermediate sealing case (8) acts as primary seal, and sealing case (6) acts as main seal.

The second scenario is the installation of device (4) during the reparation of leaks or damages to cable (5); here we have three options:

First, repair the electrical cables (5) when the device has NOT been installed yet in which case it is necessary to control the pressure and integrity of the well in order to repair the cables inside the wellhead by removing the upper part of the wellhead (2).

Second, repair the electrical cables (5) when the device has NOT been installed yet; it is also necessary to control the pressure and integrity of the well. In this option, reparations are made on the surface of the wellhead without having to remove the upper part of the wellhead (2). Third and last, repair the electric cables (5) when a device (4) has already been installed; there is no need to have special procedures or equipment to control the well because the device (4) of this invention performs that function.

Next, we describe in detail that steps to install the device of the invention in each of the scenarios and options mentioned before:

Scenario One, Option One:

Step A: The method starts assembling the mandrel adaptor (23) of case (8) with the lower connector (9) using male or female threaded couplings (811-911) to seal the internal pressure with one or two hydraulic contention a-rings (816) in contact with the sealing area (821); these two pieces assemble in the tubing hanger (3) by an external thread (811) of the mandrel adaptor (23) sealing the pressure between the mandrel adaptor (23) and the tubing hanger (3) by three hydraulic contention a-rings that are in contact with the internal cylinder of the tubing hanger (3) seal; then, the assembly of the primary or lower sealing case (10) starts in the lower part of the tubing hanger (3) by attaching the lower housing chamber (112) to the lower connector (9) or directly to the tubing hanger (3) suing male and female threaded couplings (111-911), sealing the internal pressure with two hydraulic contention a-rings (116) that are in contact with sealing area (921); next, the lower closing ring (117), guide rings (115), compression rings (113), and sealing gaskets (114) are placed in the lower part of the electrical cables (5) on the lead mechanical protection (20); with the elements already in place, the electrical cables (5) are passed through the lower housing chamber (112), the lower connector (9) and the mandrel adaptor (23) that are assembled in the tubing hanger (3). Once the electrical cables (5) have been passed through and placed, guide rings (115) are installed, as well as compression rings (113) and sealing gaskets (114) within the inner cylinder of the lower housing chamber (112); the primary or lower seal case (10) is closed attaching the lower closing ring (117) to the lower housing chamber (112) using male and female threaded couplings (129), sealing the pressure through the hydraulic contention a-rings (130) located in the two compression rings (113) that are in contact with the interior cylinder of the lower housing chamber (112). Having assembled, placed, and closed the primary or lower sealing case (10), the pressure and hydraulic integrity of the well is controlled once the wellhead is assembled completely.

Step B: The assembly of the main or intermediate sealing case (8) continues in the upper part of the tubing hanger (3) by installing the guide rings (815), the compression rings (813) and the sealing gaskets (814) on the EPDM insulation (19) of the electric cable (5) already placed inside the internal cylinder of the mandrel adapter (23); the main or intermediate sealing case (8) is closed by attach in the mandrel closing ring (822) to the mandrel adaptor (823) using male and female threaded couplings (829), sealing the pressure through the hydraulic contention a-rings (830) located in the two compression rings (813) that are in contact with the internal cylinder of the mandrel adaptor (823). Having assembled, placed, and closed the main or intermediate sealing case (8), the main seal of the device, object matter of this invention, is obtained.

Step C: The upper connector (7) is assembled in the upper part of the main or intermediate sealing case (8), with the mandrel adaptor (823) using male and female threaded couplings (811-711); sealing the internal pressure with hydraulic contention a-rings (816) that are in touch with sealing area (721), and sealing the external pressure with three hydraulic contention a-rings (716) located in the outer part of the upper connector (7) that is in contact with the internal cylinder of the wellhead's upper section seal (2); then, the protecting bushing (26) is assembled with the upper part of the upper connector (7) with male and female threaded couplings (2611-711); sealing the internal pressure with hydraulic contention a-rings (2616) that are in contact with the sealing area (721).

Step D: Finally, the tubing hanger (3) is assembled inside the lower section of the wellhead (1), closing the upper section of the wellhead (2). Having assembled, placed, and closed the wellhead together with the device of this invention (4), the system is complete and the equipment can be connected to the external power source, as it is shown in FIG. 1.

Scenario One. Option Two:

Step A: The method starts assembling the intermediate sealing case (8) in the upper part of the tubing hanger (3) by attaching the mandrel adaptor (823) to the tubing hanger (3) using the external thread (811) of the mandrel adaptor (823), sealing the pressure between the mandrel adaptor (823) and the tubing hanger (3) with three hydraulic contention a-rings (816) that are in contact with the internal cylinder seal of the tubing hanger (3); next, the electrical cables (5) are passed through the mandrel adaptor (823), which are assembled in the tubing hanger (3); once the electric cables (5) are passed and placed guide rings (815) are installed, as well as compression rings (813) and sealing gaskets (814) on the lead mechanical protection (20) of the electric conductor (5), inside the internal cylinder of the mandrel adaptor (823); the main or intermediate seal case (8) is closed by attaching the mandrel closing ring (822) to the mandrel adaptor (823) with male and female threaded couplings (829), sealing the pressure through the hydraulic contention a-rings (830) located in the two compression rings (813) that are in contact with the interior cylinder of the mandrel adaptor (823). Having assembled, placed, and closed the intermediate sealing case (8), the pressure and hydraulic integrity of the well is controlled, once the wellhead is assembled completely.

Step B: The upper connector (7) is assembled in the upper part of the intermediate sealing case (8), with the mandrel adaptor (823) using male and female threaded couplings (811-711); sealing the internal pressure with hydraulic contention a-rings (816) that are in touch with sealing area (721), and sealing the external pressure with three hydraulic contention a-rings (716) located in the outer part of the upper connector (7) that is in contact with the internal cylinder of the wellhead's upper section seal (2); then, the tubing hanger (3) is assembled in the lower section of the wellhead (1), closing the upper section of the wellhead (2).

Step C: The reparation or upper sealing case (6) is assembled in the upper part of the upper connector (7) and outside the upper section of the wellhead (2) by attaching the upper housing chamber (625) with the upper connector (7) using male and female threaded couplings (611-711), sealing the internal pressure with two hydraulic contention a-rings (616) in contact with the sealing area (721); next, the guide rings (615) are installed, as well as the compression rings (613) and the sealing gaskets (614) on the EPDM insulation (19) of the electric cable (5) inside the internal cylinder of the upper housing chamber (625); the main or upper sealing case (6) is closed by attaching the upper chamber closing ring (624) to the upper housing chamber (625), using male and female threaded couplings (629), sealing the pressure through hydraulic contention a-rings (630) located in the two compression rings (613) in contact with the interior cylinder of the upper housing chamber (625). Having assembled, placed, and closed the reparation or upper sealing case (6), the main seal of the device, subject matter of this invention, is achieved. The system is complete and the equipment can be connected to the external power source.

Scenario Two (Installation During the Reparation) Option One:

Step A: The internal pressure of the well is controlled using the standard methods and procedures of the oil industry, with the purpose of removing the damaged sealing systems and installing the device of this invention (4) safely, without having to raise the piping; once the well is under control, the upper section of the wellhead (2) is disassembled to show the upper part of the tubing hanger (3); after that, the existing and/or defective sealing systems are removed.

Step B: The assembly of the intermediate sealing case (8) starts in the upper part of the tubing hanger (3) by attaching the mandrel adaptor (823) to the tubing hanger (3) using the external thread (811) of the mandrel adaptor (823), sealing the pressure between the mandrel adaptor (823) and the tubing hanger (3) with three hydraulic contention a-rings (816) in contact with the internal sealing cylinder of the tubing hanger (3); after, the electrical cables (5) are repaired using connection or reparation methods for the insulation, as the case may be, to recover the operation of the electrical conductor (5); once the electrical cables (5) are repaired, guide rings (815) are installed, as well as the compression rings (813) and sealing gaskets (814) on the lead mechanical protection (20) of the electrical cable (5), inside the internal cylinder of the mandrel adapter (823);

The main or intermediate sealing case (8) is closed by attaching the mandrel closing ring (822) to the mandrel adaptor (823) using male and female threaded couplings (829), sealing the pressure through four hydraulic contention a-rings (830) located in the two compression rings (813) in contact with the internal cylinder of the mandrel adaptor (823). Having assembled, placed, and closed the intermediate sealing case (8), the pressure and hydraulic integrity of the well is controlled, once the wellhead is completely assembled.

Step C: The upper connector (7) is assembled in the upper part of the main or intermediate sealing case (8), with the mandrel adaptor (823) using male and female threaded couplings (811-711); sealing the internal pressure with two hydraulic contention a-rings (816) in contact with sealing area (721). The upper section of the wellhead (2) is installed again and the external pressure is sealed with three hydraulic contention a-rings (716) located in the outer part of the upper connector (7) that is in contact with the internal cylinder of the wellhead's upper section seal (2).

Step D: The reparation or upper sealing case (6) is assembled in the upper part of the upper connector (7) and outside the upper section of the wellhead (2) by attaching the upper housing chamber (625) with the upper connector (7) using male and female threaded couplings (611-711), sealing the internal pressure with two hydraulic contention a-rings (616) in contact with the sealing area (721); next, the guide rings (615) are installed, as well as the compression rings (613) and the sealing gaskets (614) on the EPDM dielectric insulation (19) of the electric cable (5) inside the internal cylinder of the upper housing chamber (625); the main or upper sealing case (6) is closed by attaching the upper chamber closing ring (624) to the upper housing chamber (625), using male and female threaded couplings (629), sealing the pressure through hydraulic contention a-rings (630) located in the two compression rings (613) in contact with the interior cylinder of the upper housing chamber (625). Having assembled, placed, and closed the reparation or upper sealing case (6), the main seal of the device, subject matter of this invention, is achieved. The system is complete and repaired, and the equipment can be connected to the external power source.

Scenario Two (Installation During the Reparation) Option Two:

Step A: If necessary, the internal pressure of the well is controlled using the standard methods and procedures of the oil industry, with the purpose of repairing damaged sealing systems and installing the device of this invention (4) safely in the outer part of the upper section of the wellhead (2), without having to raise the piping or disassemble the upper section of the wellhead (2), In this case, it is necessary to assemble the reparation or upper sealing case (6) only.

Step B: Once the well is under control, the upper housing chamber (625) is installed and adapted to the outer part of the upper section of the wellhead (2) using male and female threaded couplings (611). Then, the electrical cables (5) are repaired using methods to connect or repair the insulation, as the case may be, to recover the operation of the electrical cable (5); once the electrical cables (5) have been repaired, the guide rings (615) are installed, as well as the compression rings (613) and the sealing gaskets (614) on the EPDM dielectric insulation (19) of the electrical cable (5), inside the internal cylinder of the upper housing chamber (625); the reparation or upper sealing case (6) is closed by attaching the upper chamber closing ring (624) to the upper housing chamber (625), using male and female threaded couplings (629), sealing the pressure through hydraulic contention o-rings (630) located in the two compression rings (613) in contact with the interior cylinder of the upper housing chamber (625). Having assembled, placed, and closed the reparation or upper sealing case (6), the main seal of the device, subject matter of this invention, is achieved. The system is complete and repaired, and the equipment can be connected to the external power source.

Scenario Two (Installation During the Reparation). Option Three:

This is the main method to repair damages because it considers the complete use of the device (4), subject matter of this invention, when it has already been installed, according to the method described in scenario one and subject to any of the two options described above. This method offers more benefits because the well is under control and, therefore, it does not need special methods of procedures to carry out the necessary reparations.

This option has a step A that consists of verifying the location of the damage in the electric cable (5); if the damage is inside the wellhead, the procedure of Alternative A is executed; if the damage is in the outer part of the wellhead, the option is Alternative B.

Alternative A

Step A: The upper section of the wellhead (2) is removed, as well as the protecting bushing (26) or the reparation or upper sealing case (6) and the upper connector (7); this reveals the upper part of the tubing hanger (3). The electrical cables (5) are repaired using methods to connect or repair the insulation, as the case may be, to recover the operation of the electrical cable (5).

Step B: Having repaired the electrical cables (5) the upper connector (7) is reinstalled in the mandrel adaptor (823) using male and female threaded couplings (711-811), sealing the internal pressure with two hydraulic contention a-rings (816) in contact with the sealing area (721); the upper section of the wellhead (2) is reinstalled, sealing the external pressure with three hydraulic contention o-rings (716) located in the outer part of the upper connector (7) in contact with the internal sealing cylinder of the upper section of the wellhead (2).

Step C: Depending on the configuration found, the protecting bushing (26) or the reparation or upper sealing case (6) is reassembled in the upper part of the upper connector (7) and outside the upper section of the wellhead (2), by attaching the upper housing chamber (625) to the upper connector (7) using male and female threaded couplings (611-711); sealing the internal pressure with two hydraulic contention a-rings (616) in contact with the sealing area (721); next the guide rings (615) are installed, as well as the compression rings (613) and the sealing gaskets (614) on the EPDM dielectric insulation (19) of the electrical cable (5), inside the internal cylinder of the upper housing chamber (625); the reparation or upper sealing case (6) is closed by attaching the upper chamber closing ring (624) to the upper housing chamber (625), using male and female threaded couplings (629), sealing the pressure through hydraulic contention a-rings (630) located in the two compression rings (613) in contact with the internal cylinder of the upper housing chamber (625). Having assembled, placed, and closed the reparation or upper sealing case (6), the main seal of the device, subject matter of this invention, is achieved. The system is complete and repaired, and the equipment can be connected to the external power source.

Alternative B

Step A: Remove the protecting bushing (26) or the reparation or upper sealing case (6) and remove the upper connector (7) revealing the damaged electric cables (5); repair the electric cables (5) using methods to connect or repair the insulation, as the case may be, to recover the functionality of the electric cable (5). Once the electrical cables (5) have been repaired, and according to the configuration found, the protecting bushing (26) or the reparation or upper sealing case (6) is reassembled in the upper part of the upper connector (7) and outside the upper section of the wellhead (2) by attaching the upper housing chamber (625) to the upper connector (7), using male and female threaded couplings (611-711), sealing the internal pressure with two hydraulic contention a-rings (616) in contact with the sealing area (721); next, the guide rings (615) are installed, as well as the compression rings (613) and the sealing gaskets (614) on the EPDM dielectric insulation (19) of the electrical cable (5), inside the internal cylinder of the upper housing chamber (625); the reparation or upper sealing case (6) is closed by attaching the upper chamber closing ring (624) to the upper housing chamber (625), using male and female threaded couplings (629), sealing the pressure through hydraulic contention a-rings (630) located in the two compression rings (613) in contact with the internal cylinder of the upper housing chamber (625). Having assembled, placed, and closed the reparation or upper sealing case (6), the main seal of the device, subject matter of this invention, is achieved. The system is complete and repaired, and the equipment can be connected to the external power source.

The invention claimed is:

1. A device for sealing and repairing one or more electrical cables that pass through wellheads, the device comprising:
    one or two connecting bushings;
    a top end;
    a tubing hanger comprising an upper side; and
    one or more sealing cases wherein each case contains a sealing unit inside;
    wherein a first of said one or more sealing cases is located on said top end;
    wherein at least one of said one or more sealing cases is installed within said tubing hanger;
    wherein at least one of the cases attaches to one of the connecting bushings;
    wherein each sealing unit has one or more elastomer sealing gaskets that form a path for each of said one or more electrical cables to pass through when placed inside said one or more sealing cases;
    wherein said one or two connecting bushings each comprise a lower end and an upper end;
    wherein said at least one sealing case of said one or more sealing cases that is installed inside the tubing hanger comprises a sealing case upper end and a sealing case lower end and is attached by said sealing case upper end to said lower end of a first of said one or two connecting bushings; and
    wherein the other of said one or more sealing cases is attached to said upper end of said first of said one or two connecting bushings.

2. The sealing device as described in claim 1,
    wherein said at least one sealing case of said one or more sealing cases that is installed inside the tubing is attached by said lower end to said upper end of a second of said one or two connecting bushings; and
    wherein a third of said one or more sealing cases is attached to said lower end of said second of said one or two connecting bushings.

3. The sealing device as described in one of claims 1 or 2, wherein said first of said one or more sealing cases located on said top end is a repairing case and further comprising:
    an upper housing chamber;
    one or more threading systems;
    a seal housing where a sealing unit is located;
    room for one or more a-rings; and
    an upper chamber closing ring with a threading system.

4. The sealing device as described in claim 3, wherein each of said sealing units comprise:
    one or two cylindrical metallic or dielectric compression rings with one or more a-rings; and
    wherein said one or more elastomer sealing gaskets, when placed and aligned between two of said cylindrical compression rings, form a path used to introduce one of said one or more electrical cables.

5. The sealing device as described in claim 4, wherein said sealing gaskets are cylindrical and have a curved side surface with an a-ring-shape central protrusion.

6. The sealing device as described in one of claims 1 or 2, wherein said one or more sealing cases further comprise:
    a main or lower seat;
    a lower housing case;
    one or more threading systems;
    a seal housing where said sealing unit is located;
    space for one or more a-rings; and
    a lower chamber closing ring that comprises a threading system.

7. The sealing device as described in claim 6, wherein each of said sealing units comprise:
    one or two cylindrical metallic or dielectric compression rings with one or more a-rings; and
    wherein said one or more elastomer sealing gaskets, when placed and aligned between two of said cylindrical compression rings, form a path used to introduce one of said one or more electrical cables.

8. The sealing device as described in one of claim 1 or 2, wherein said connecting bushings and cases are made of metal and cylindrical both inside and outside.

* * * * *